006 # United States Patent [19]

Inoue

[11] 4,441,004
[45] Apr. 3, 1984

[54] MULTIPLE PIPE ELEMENT ELECTRODE ASSEMBLY EDM METHOD AND APPARATUS

[75] Inventor: Kiyoshi Inoue, Tokyo, Japan

[73] Assignee: Inoue-Japax Research Incorporated, Yokohama, Japan

[21] Appl. No.: 271,982

[22] Filed: Jun. 9, 1981

[30] Foreign Application Priority Data

Jun. 12, 1980 [JP] Japan ................................. 55-78383
Jun. 25, 1980 [JP] Japan ................................. 55-85185
Jun. 26, 1980 [JP] Japan ................................. 55-86909
Jun. 26, 1980 [JP] Japan ................................. 55-86910

[51] Int. Cl.³ ............................................. B23P 1/08
[52] U.S. Cl. ................................ 219/69 E; 219/69 P; 219/69 M
[58] Field of Search .............. 219/69 V, 69 E, 69 M, 219/69 G, 68, 69 P

[56] References Cited

U.S. PATENT DOCUMENTS 3,740,519  6/1973  O'Connor ........................ 219/69 E
4,017,705  4/1977  Bazhenov et al. ................ 219/69 C
4,242,557 12/1980  Sato et al. ........................ 219/69 E

FOREIGN PATENT DOCUMENTS

933731  8/1963  United Kingdom .............. 219/69 E

Primary Examiner—M. H. Paschall
Attorney, Agent, or Firm—Karl F. Ross; Herbert Dubno

[57] ABSTRACT

A multiplicity of conductive pipe elements are arranged in parallel with one another in mutually insulating relationship and are secured together in a cup to form a multiple electrode assembly. The assembly is advanced into a workpiece in the machining feed direction and additionally is displaced relative to the workpiece by a Z-axis motor in a plane orthogonal to the machining feed direction by X-axis and Y-axis motors a distance slightly in excess of the uniform spacing (Gx,Gy) between the pipe electrodes along each of two mutually orthogonal axes in the plane. The additional displacement may be effected alternatively by vibrating the pipe elements transversely to the axes thereof with an amplitude essentially equal to the said distance. For further machining of the same workpiece, a proportion of the pipe elements may be released from the securely held state and individually advanced and/or retracted with rates of movement determining the shapes of the final machined contour. The power supply comprises an AC-DC-HF-DC Pulse inverter having multiple output terminals respectively connected to the multiple pipe elements. Machining liquid is pumped to and from the machining gaps via the pipe elements.

30 Claims, 13 Drawing Figures

MULTIPLE PIPE ELEMENT ELECTRODE ASSEMBLY EDM METHOD AND APPARATUS

FIELD OF THE INVENTION

The present invention relates generally to electrical discharge machining (EDM) and, more particularly, to a new and improved EDM method of and apparatus for machining a conductive workpiece by effecting a succession of electrical discharges between a tool electrode and the workpiece across a dielectric filled minute machining gap while advancing the tool electrode into the workpiece to form a cavity therein of a desired shape generally complementary to the shape of the tool electrode.

BACKGROUND OF THE INVENTION

In electrical discharge machining of the type described above, which is commonly called "sinking EDM", it has hitherto been necessary to prepare a tool electrode shaped with a desired contour to be complementarily reproduced in the workpiece. Thus, a conventional sinking-type EDM electrode may be a precision-machined conductive block or a sheet metal element precision-deformed or obtained on a precision-electroforming mold. The preparation of such a tool electrode, however, is generally time-consuming and/or entails considerable skill and labor and, as a consequence, may make a desired EDM job unduly costly or often impractical. Furthermore, an EDM electrode is subject to electroerosive wear and must be frequently replaced in a customary EDM operation and this requirement further adds to cost and labor.

These problems may be alleviated by an improved EDM tool electrode disclosed in U.S. Pat. No. 2,909,641 to KUCYN issued Oct. 20, 1959 wherein a multiplicity of conductive pins are stacked in side-by-side relationship to constitute the tool electrode whereby the end surfaces of the pin combine to establish a desired machining face for the electrode. Such a tool electrode, however, is only applicable to rough EDM operations and is incapable of yielding a satisfactory EDM surface finish, thus necessitating a laborious and time-consuming hand-finishing of the rough-machined surface.

OBJECTS OF THE INVENTION

It is, accordingly, a principal object of the present invention to provide an improved EDM method which is capable of machining a cavity in a workpiece in an efficient manner with a due precision and an excellent surface finish and whereby the tool electrode is readily prepared.

Another principal object of the invention is to provide a novel EDM apparatus which makes use of an improved multiple electrode assembly readily assemblable to establish a preselected machining shape and which apparatus is extremely efficient achieving a desired cavity in the workpiece in a relatively short period of time and with due precision and better surface finish.

SUMMARY OF THE INVENTION

In accordance with the present invention, in a first apsect thereof, there is provided a EDM method of machining a conductive workpiece, comprising the steps of: securely holding together a multiplicity of conductive open-ended pipe elements arranged in parallel with one another with a predetermined uniform spacing in a mutually insulating relationship to form a multiple electrode assembly having an imaginary envelope surface of a preselected machining shape essentially defined by the frontal open-end portions of the said conductive pipe elements; juxtaposing the electrode assembly with the workpiece to define an EDM gap between the annular machining surface of each of the frontal open-end portions and the workpiece; flushing the multiple EDM gaps with a dielectric liquid by establishing a forced flow of the dielectric liquid through each of the pipe elements and the said frontal and rear ends thereof; effecting a succession of electrical discharges individually across each of the multiple EDM gaps by passing a succession of electrical pulses between each of the multiple pipe elements and the workpiece of cause EDM material removal from the localized areas of the workpiece juxtaposed with the said annular machining surfaces; and advancing the electrode assembly into the workpiece in a machining feed direction parallel with the pipe elements to a predetermined depth while relatively displacing the electrode assembly and the workpiece in a plane essentially orthogonal to the machining feed direction by a distance in excess of the said predetermined uniform spacing along each of two mutually orthogonal axes on the said plane.

The invention also provides, in a second aspect thereof, an EDM apparatus for machining a workpiece, comprising: a multiple electrode assembly comprising a multiplicity of conductive open-ended pipe elements to be arranged in parallel with one another with a predetermined uniform small spacing in a mutually insulating relationship and to provide an imaginary envelope surface of a preselected machining shape essentially defined by the said frontal open-end portions of the conductive pipe elements, and means for securely holding the conductive pipe elements together in the said arrangement, the electrode assembly being juxtaposable with the workpiece to define an EDM gap between the annular machining surface of each of the said frontal open-end portions and the workpiece; liquid supply means for establishing a forced flow of a dielectric liquid through each of the pipe elements, thereby flushing the multiple EDM gaps with the dielectric liquid; EDM power supply means for passing a succession of EDM pulses individually between each of the conductive pipe elements and the workpiece to effect a succession of electrical discharges across each of the said multiple EDM gaps, thereby cause EDM material removal from the localized areas of the workpiece juxtaposed with the said with the annular machining surfaces, respectively; first drive means for advancing the electrode assembly into the workpiece in a machining feed direction parallel with the pipe elements to a predetermined depth; and second drive means for relatively displacing the electrode assembly and the workpiece in a plane essentially orthogonal to the machining feed direction by a distance in excess of the said predetermined uniform spacing along each of two mutually orthogonal axes on the said plane.

BRIEF DESCRIPTION OF THE DRAWING

These and other objects and features as well as advantages of the present invention will become more readily apparent from the following description taken with reference to the accompanying drawing in which.

SPECIFIC DESCRIPTION

Figures 1, 2:
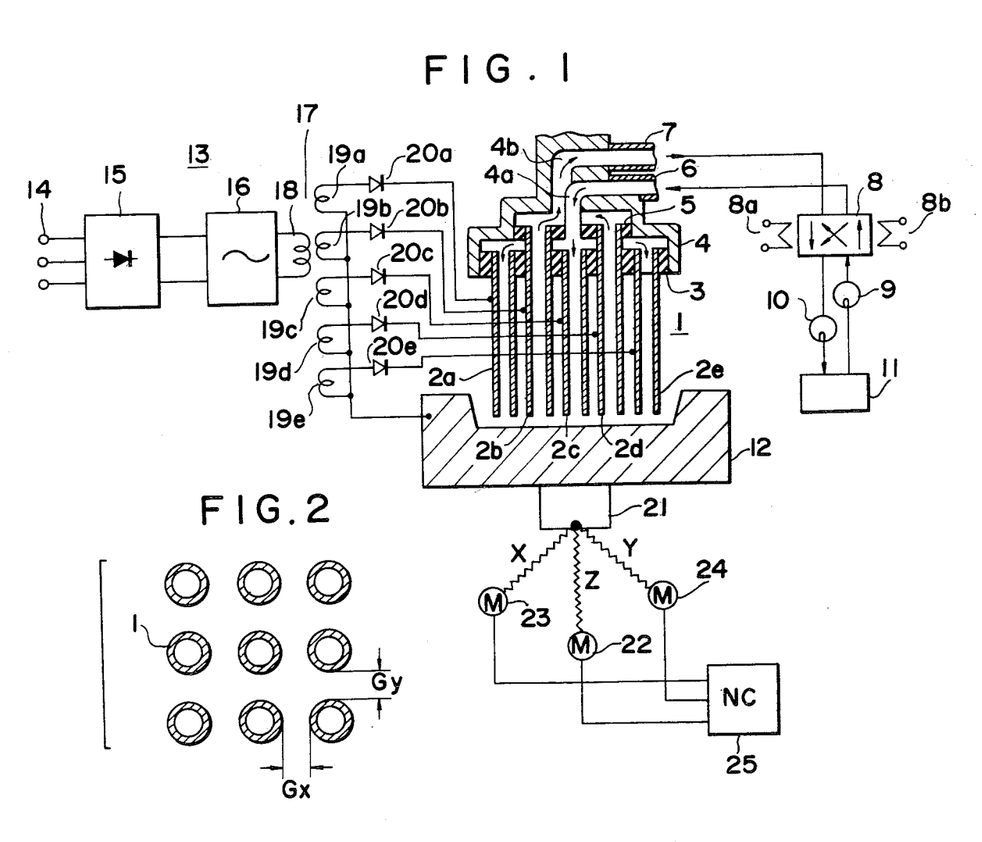
FIG. 1 is a schematic view diagrammatically illustrating an apparatus according to the invention, including a multiple pipe electrode assembly juxtaposed with a workpiece shown in elevational section, a dielectric supply unit, an EDM power supply assembly and machining feed and electrode drive means.
FIG. 2 is an enlarged cross-sectional view of a group of pipe elements arranged so as to be uniformly spaced apart from one another in the electrode assembly.

Referring first to FIG. 1, an improved multiple electrode assembly 1 is shown comprising a multiplicity of electrically conductive pipe elements 2a, 2b, 2c, 2d, 2e... each of which should preferably be thin, i.e. having an outer diameter less than 1 mm and an inner diameter less than 0.5 mm, and is open-ended at both ends. Each pipe element, which may be composed of any metal or alloy but should be preferably of copper or brass, is of any simple cross-sectional shape such as a circle, triangle or square but should conveniently be circular in cross-section. The multiple pipe elements 2a, 2b, 2c, 2d, 2e... are arranged in parallel with one another, being mutually spaced apart with a predetermined uniform spacing Gx, Gy as shown in FIG. 2 and are arranged to define an imaginary envelope surface of a preselected machining shape essentially with their frontal end portions. In the arrangement described, the pipe elements are held together by being secured to a plate 3 of an electrically insulating material such as plastics which material is securely fitted in an inverted generally cup-shaped support member 4. The latter is formed with two separate passageways 4a and 4b therein which communicate with a first group of pipe elements, 2a, 2c, 2e... and a second group of pipe elements 2b, 2d, .... respectively. The passageways 4a and 4b are defined by inner wall portions of the support cup 4 and is separated from each other by a further insulating plate 5 which holds the pipe elements 2b, 2d... securely fitted in the cup 4. The passageways 4a and 4b are fitted with fluid conduits 6 and 7, respectively, which are connected via a valve 8 to pumps 9 and 10 respectively. The pump 9 draws a liquid dielectric from a reservoir 11 to feed it under an elevated pressure via the conduit 6 and the passageway 4a to the pipe elements 2a, 2c, 2e... and in turn into the region of a workpiece 12. A suction is created by the pump 10 to draw the dielectric liquid in the region of the workpiece 12 into the pipe elements 2b, 2d... and then to return it through the passageway 4b and the conduit 7 to the reservoir 11.

An EDM power supply particularly suitable for the multiple pipe EDM electrode system 1 according to the invention is shown comprising an AC-DC-HF-DC Pulse system 13 fed with the output terminals 14 of commercial AC power source. The three-phase AC output is converted by a rectifier 15 into a continuous DC. A high-frequency generator 16 is connected to the rectifier 15 to produce a succession of high-frequency pulses or a high-frequency AC of a frequency of 100 kHz to 1 MHz which is applied to the primary winding 18 of a high-frequency transformer 17. The transformer 17 has multiple secondary windings 19a, 19b, 19c, 19e... whose one ends are tied together and connected to the workpiece 12. The other ends of these multiple secondary windings are connected via diodes 20a, 20b, 20c, 20d, 20e... to the multiple pipe electrode elements 2a, 2b, 2c, 2d, 2e... respectively. As a result, a succession of high-frequency DC pulses of a frequency of 100 kHz to 1 MHz of an established voltage level develops individually between each of the multiple pipe electrode elements 2a, 2b, 2c, 2d, 2e... and the workpiece 12 to create a succession of discrete and time-spaced electrical discharges of a pulse duration and interval between 1 and 100 microseconds across each of the multiple EDM gaps defined between these electrode elements and the workpiece 12. The pumps 9 and 10 are adapted to flood the multiple EDM gaps with the dielectric liquid from and into the pipe electrodes at an elevated pressure of 10 to 100 kg/cm$^2$. The dielectric liquid may be any common EDM machining liquid such as hydrocarbon liquid, e.g. kerosene, but preferably is a water liquid deionized to a specific resistivity of $10^3$ to $10^5$ ohm-cm. Successive electrical discharges are created across each of the multiple EDM gaps defined between the respective annular surfaces of the frontal ends of the pipe electrodes and the workpiece 12 to produce material removal from the localized area of the workpiece 12 juxtaposed with each annular surface.

The workpiece 12 is securely mounted on a carriage 21 adapted to be displaced by three motors 22, 23 and 24 driven by drive signals furnished from a numerical control (NC) unit 25. The motor 22 is driven to displace the workpiece 12 relative to the multiple pipe electrode assembly 1 along a Z-axis, that is in a machining feed direction parallel with the pipe electrodes and the command drive signals from the NC unit 25 to displace the workpiece in the Z-axis direction continues until a predetermined machining depth preprogrammed therein is reached. The motors 23 and 24 are driven to displace the workpiece 12 relative to the electrode assembly 1 in an X-Y plane orthogonal to the Z-axis i.e. along two mutually orthogonal axes thereon, X-axis and Y-axis, respectively, by a distance, preprogrammed in the NC unit 25 and which is slightly in excess of the afore-said predetermined uniform spacing Gx, Gy between the adjacent pipe electrodes, along each of these latter axes. The displacement in the X-Y plane is executed preferably incrementarily in conjunction with the displacement along the Z-axis. In this manner, the annular machining electrode surface of each frontal end portion of the pipe elements 2a, 2b, 2c, 2d, 2e... is moved three-dimensionally to progressively advance material removal in the vertical direction or to progressively sink into the workpiece and, in addition, to sweep over the localized area by a small distance in the two mutually or orthogonal horizontal directions. In this manner, by sizing this distance in total to be in excess of spacing Gx, Gy, the multiple annular machining electrodes are capable of smoothly machining the workpiece without leaving unmachined areas corresponding to the opening portions of the individual pipe elements and their interstices. Furthermore this distance should be slightly in excess of spacing Gx, Gy so that the cavity formed in the workpiece closely conforms in shape and size with the imaginary envelope surface essentially constituted collectively by the frontal end portions of the pipe elements. Of course, it is also possible that the pipe elements may be assembled to provide a planar imaginary envelope surface and the assembled pipe elements or assembly 1 may be displaced three-dimensionally along three independent axes, X, Y and Z, along preprogrammed selected paths to achieve a machined cavity which is generally independent of the contour of the planar imaginary envelope surface and is essentially defined by the selected displacement paths.

For efficient and stabilized material removal with the multiple pipe electrode assembly 1, it is essential that the multiple EDM gaps be flushed with the liquid dielectric pumped from or into the multiple pipe elements 2a, 2b, 2c, 2d, 2e... individually at an elevated pressure generally between 10, 100 kg/cm² and preferably at least 20 or 30 Kg/cm² and more preferably at least 50 kg/cm². Further, although all the pipe elements may be arranged either to supply the dielectric liquid to or suck it from the individual EDM gaps to create the flushing condition, it has been found to be more advantageous, as shown, to furnish the dielectric liquid from one group of pipe elements 2a, 2c, 2e... into the individual EDM gaps and to draw from the latter the dielectric liquid into another group of pipe elements 2b, 2d... for return to the reservoir, because an extremely favorable gap flushing characteristic for each individual EDM gap is then obtained. In this connection, it is further advantageous to cylcically switch over the dielectric flows through the two conduit systems. To this end, the valve 8 should be an electromagnetically operated valve having a pair of operating solenoids 8a and 8b so that when the solenoid 8a is energized, the valve is switched to establish the dielectric flow in the direction shown, i.e. from the conduit 6 through the passageway 4a, pipe elements 2a, 2c, 2e... to the EDM gaps and thence from the latter via pipe elements 2b, 2d..., the passageway 4b and the conduit 7 back to the reservoir 11. When the solenoid 8b is energized, the valve 8 is switched to establish the dielectric flow in the opposite direction, i.e. from the conduit 7 via the passageway 4b and pipe elements 2b, 2d... to the EDM gaps and then from the latter via pipe elements 2a, 2c, 2e..., the passageway 4a and the conduit 6 back to the reservoir 11. In this manner, the individual EDM gaps are flushed equally with the dielectric liquid flows each of which bridges from one pipe to another adjacent thereto and thus causes practically no stagnancy. The dielectric liquid comes to uniformly flush the multiple EDM gaps which may amount to an increased row and column and hence to a greater total area. Machined chips, tar and gases are thus removed with greater facility, permitting EDM material removal to progress with an enhanced discharge stability and machining rate.

EXAMPLE

With a conventional EDM system using a shaped copper block electrode and a kerosene dielectric liquid, the removal of a stock of 3 grams requires a machining time of 5 minutes to yield a rough surface finish of 35 μRmax and a machining time of 300 minutes to yield a finer surface finish of 10 μRmax. The use of a pin-assembled conventional electrode tool allows only roughing EDM and requires a machining time of at least 7 minutes. In comparison, a multiplicity of copper pipe elements each having an outer diameter of 0.5 mm and an inner diameter of 0.3 mm are arranged and secured together in the manner previously described to form an improved EDM electrode tool having an imaginary envelope surface of the shape identical to that of the above-mentioned block electrode. This tool is used with a water dielectric liquid pumped through the individual pipes at a pressure of 35 kg/cm² and, when displaced three-dimensionally in the manner previously described, is found to achieve EDM removal of the same amount of stock in a machining time of 7 minutes to yield a surface finish of 6 μRmax and in a machining time of 5 minutes to yield a surface finish of 4 μRmax. Essentially the same results and even better results are found to be obtained with pipe elements each having an outer diameter of 0.3 mm and an inner diameter of 0.17 mm and with pipe elements each having an outer diameter of 0.2 mm and an inner diameter of 0.08 mm.

Figure 3:
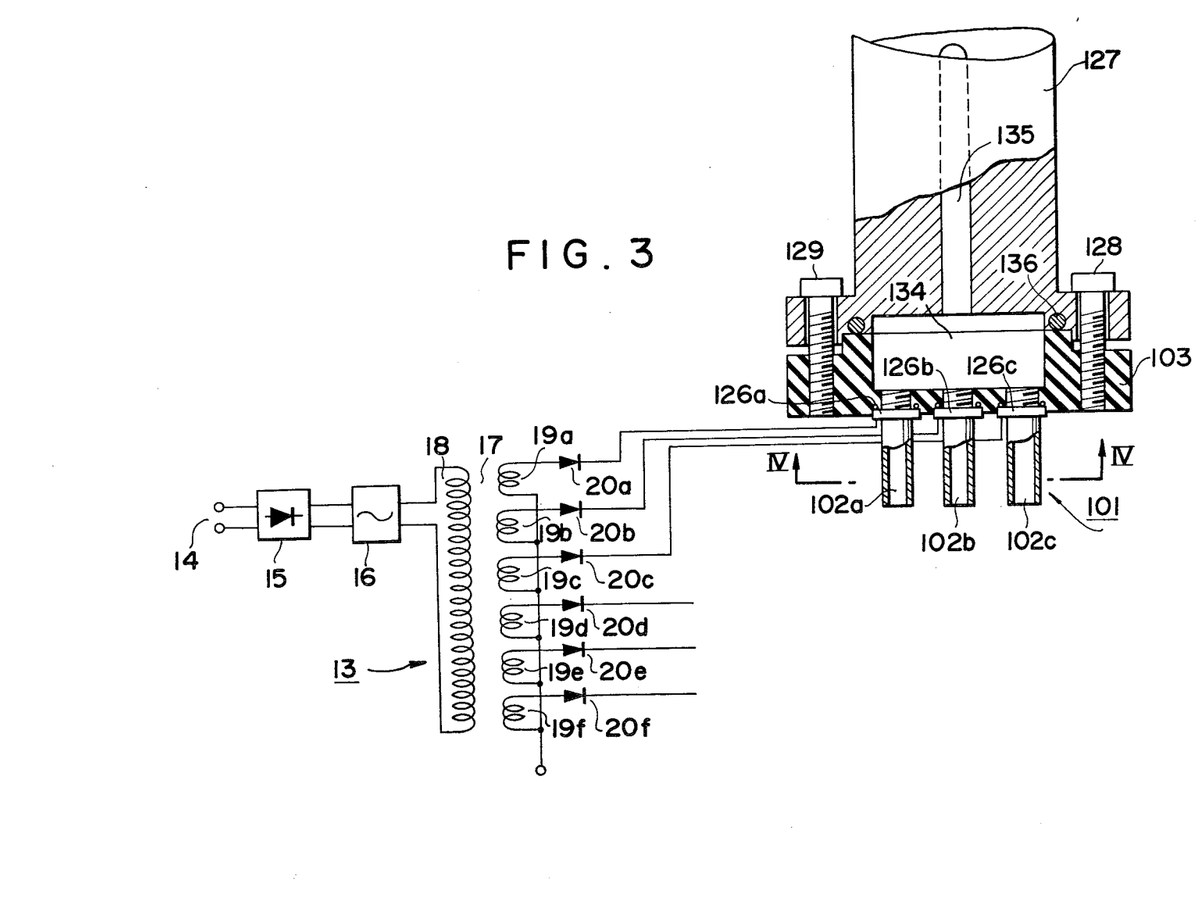
FIG. 3 is a schematic view illustrating another electrode assembly of the invention, shown in elevational section, having a multiplicity of conductive pipe elements connected, respectively, to the multiple output terminals of an EDM power supply according to a further feature of the invention.
Figure 4:
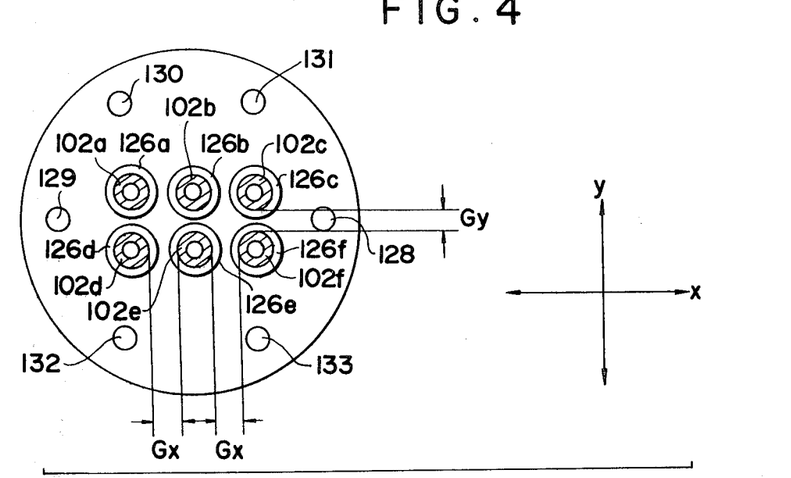
FIG. 4 is a plan view of the electrode assembly of FIG. 3, viewed from below.

In the arrangement shown in FIGS. 3 and 4, a multiplicity of conductive pipe elements which are illustrated, for the sake of simplicity, as being six in number, 102a, 102b, 102c, 102d, 102e and 102f are individually fitted in metal rings 126a, 126b, 126c, 126d, 126e and 126f, respectively, which are, in turn, fitted securely in an insulating plate 103. The metal rings 126a–126f form current conductors for the pipe elements 102a-102f and are energized by multiple output terminals of the 'AC-DC-HF-DC'Pulse converter 13 which is already shown in FIG. 1. The insulating plate 103 is fitted to a support shaft 127 and is secured thereto by means of bolts 128-133. The lower face of the support shaft 127 and the insulating plate 103 are recessed to form a compartment 134 which communicates on one hand to a dielectric liquid supply (not shown) via a passageway 135 formed in the support shaft 127 and on the other hand with the multiple pipe elements 102a-102f. The function of the compartment 134 is to temporarily store the dielectric liquid supplied from the source and to distribute it into the multiple pipe elements 102a-102f. The liquid source not shown includes a pump to pressurize the dielectric liquid in the compartment 134 thereby causing the dielectric liquid to pass through each pipe element and to be pumped out of it at a high flow velocity and with an elevated pressure in the range previously described. A ring gasket 136 is used to hermetically seal the compartment 134. As shown in FIG. 4, the pipe elements 102a-102f are uniformly spaced from one another with a spacing Gx in the direction of X-axis and a spacing Gy in the direction of Y-axis where Gx and Gy are adjusted usually to be equal to each other.

Figure 5:
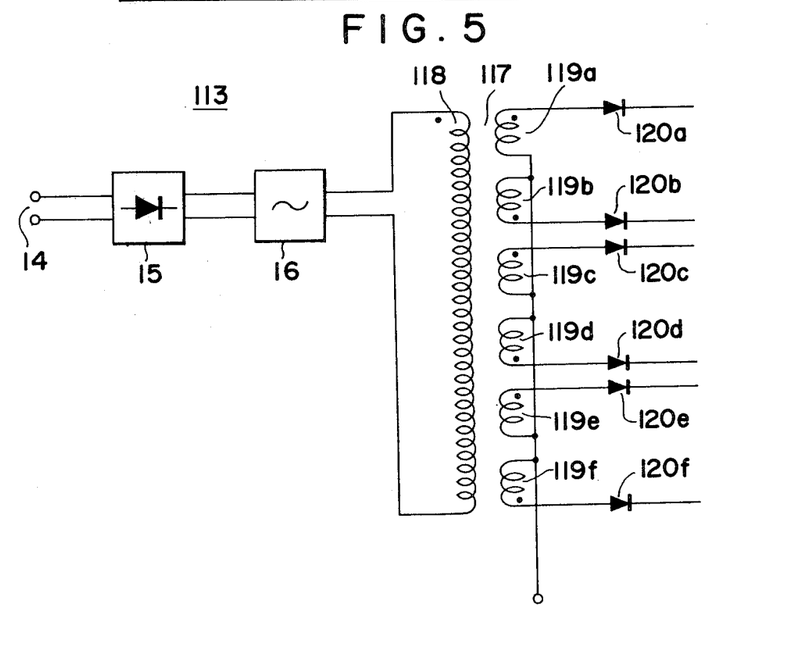
FIG. 5 is a circuit diagram illustrating an improved EDM power supply particularly suitable for connection with multiple pipe elements of the invention.

A modified 'AC-DC-HF-DC Pulse' inverter power supply 113 shown in FIG. 5 includes a high-frequency transformer 117 having its primary winding 118 fed with the output of the high-frequency generator 16 as in the previous embodiment and multiple secondary windings paired into 119a and 119b; 119c and 119d; and 119e and 119f. In each of these pairs, the lower lead of an upper winding 119a, 119c, 119e is joined with the upper lead of a lower winding 119b, 119d, 119f leads to the workpiece while the upper lead of the upper winding 119a, 119c, 119e and the lower lead of the lower winding 119b, 119d, 119f are connected via diodes 120a and 120b; 120c and 120d; 120e and 120f with the polarity shown to an adjacent pair of pipe electrodes, for example, 102a and 102b; 102c and 102f; 102e and 102d of FIGS. 3 and 4, respectively. As a result, when the primary winding 118 is energized, those pipe electrodes connected to diodes 120a, 120c and 102e and those pipe electrodes connected to diodes 120b, 120d and 120f are alternately energized; at any instant, only three pipe electrodes are energized. As a result, the magnitude of energizing current for each pipe electrode becomes twice as great as the magnitude of energizing current which can be available to each pipe electrode when the secondary windings are set apart from one another in the manner previously described.

Figures 6, 7:
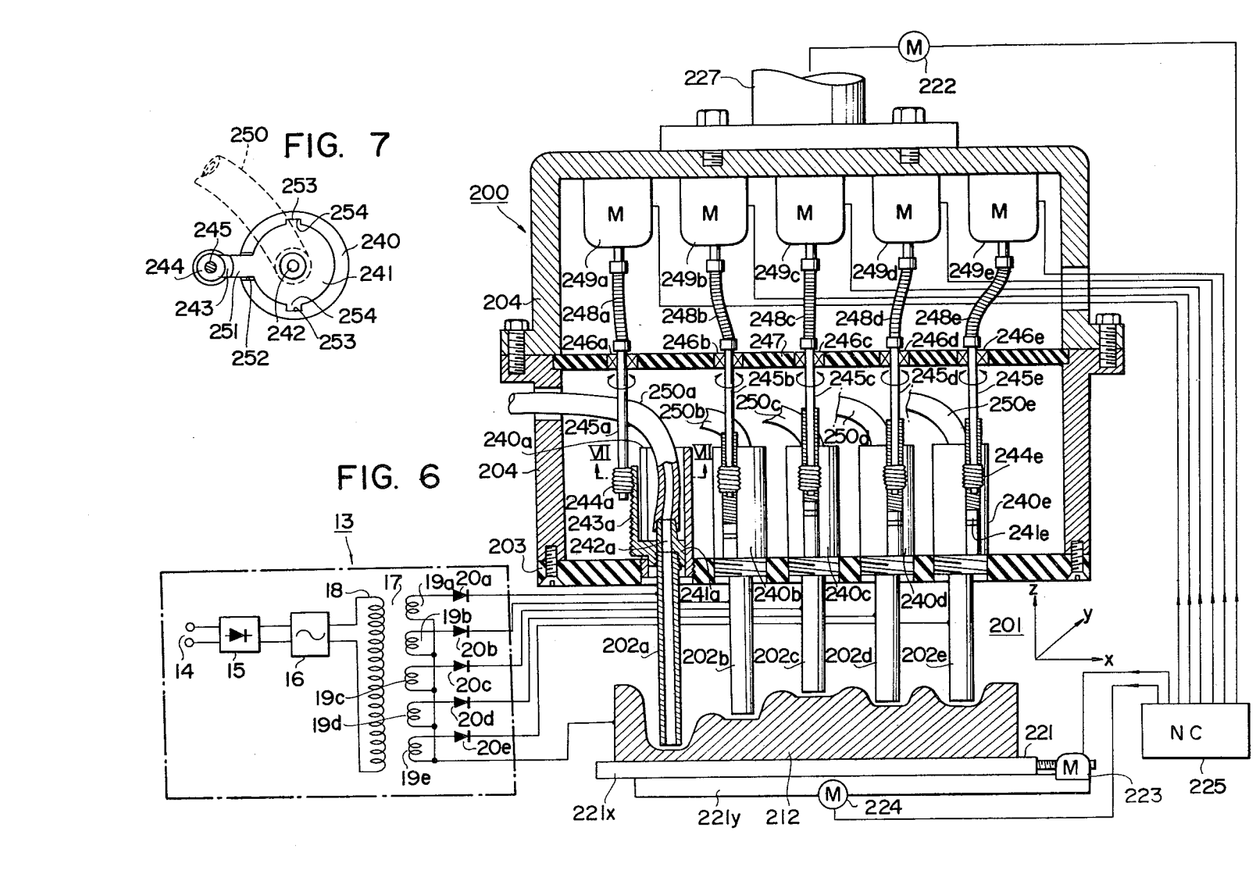
FIG. 6 is a schematic view essentially in elevational section diagrammatically illustrating another apparatus according to the invention utilizing movable pipe elementary electrodes.
FIG. 7 is a cross-sectional view of a portion of the apparatus of FIG. 6, taken along the line VII—VII.

The further embodiment of the invention shown in FIG. 6 is designed to allow multiple pipe elements to be used as being held together in a selected arrangement until a given extent of machining is reached and at the same time optionally to permit them to be individually advanced where a further machining course requires it.

In the arrangement of FIG. 6, the multiple electrode head 200 is shown comprising a hollow casing 204 carried by a support shaft 227 and an insulating plate 203 secured to the casing 204 by bolts. The plate 203 has a multiplicity of cylinders 240a, 240b, 240c, 240d and 240e securely threaded at preselected locations therein and extending into a space in the casing 204. Received slidably in each of the cylinders 240a-240e is a piston 241a . . . 241e formed with an internal bore 242a . . . and having a conductive pipe element 202a, 202b, 202c, 202d, 202e securely fitted therein. Each of the pistons 241a-241e has a rack 243a . . . projecting through the cylinder 240a, 240b, 240c, 240d, 240e and in mesh with a pinion 244a . . . 244e secured to a rotary shaft 245a, 245b, 245c, 245d, 245i e. The rotary shafts 245a-245e are journaled by bearings 246a, 246b, 246c, 246d and 246e, respectively, which are received in an insulating plate 247 secured to the side walls of the casing 204. The rotary shafts 245a-245e are drivingly coupled, via respective flexible rotary transmission shafts 248a, 248b, 248c, 248d and 248e, to stepping motors 249a, 249b, 249c, 249d and 249e, respectively, which are securely mounted to the inner top wall of the casing 204. Each of the pistons 241a-241e is fitted with a hose 250a, 250b, 250c, 250d, 250e communicating with a source of dielectric liquid (not shown) including a pump for delivering the dielectric liquid through the internal bore 242a . . . of the piston and the pipe element 202a, 202b, 202c, 202d, 202e into the machining gap at an elevated pressure in the range already described.

The multiple EDM gaps are formed individually between the annular machining surfaces at the end-open front portions of the multiple pipe electrode elements 202a, 202b, 202c, 202d and 202e and a workpiece 212 securely mounted on a worktable 221. The latter comprises a pair of drive tables 22x and 221y in a cross-slide arrangement displaced by motors 223 and 224, respectively. The motors 223 and 224 are driven by drive signals furnished from a numerical control (NC) unit 225 to displace the workpiece 212 in an X-Y plane or along an X-axis and Y-axis orthogonal to the axes of the pipe elements 202a-202e. Drive signals are also furnished from the NC unit 225 to drive a motor 222 drivingly coupled to the support shaft 227 to displace the head 200 and the electrode assembly 201 carried thereon, in a machining feed direction or along the Z-axis parallel with the pipe elements 202a-202e. The NC unit 225 may further furnish drive signals to the multiple stepping motors 249a-249e to individually advance the pipe elements 202a-202e. The EDM power supply 13 of the type previously described has here again multiple transformer output terminals individually connected to the multiple pipe electrode elements 202a-202e via rectifiers 20a-20e, respectively and the other transformer terminals connected in common to the workpiece 212.

Each of the pipe elements 202a-202e is securely threaded into the piston 241a-241e in the cylinder 240a-240e. As shown in FIG. 7, the piston 241 is formed with a projection 251 guided in a notch 252 formed in the cylinder 240. The projection 251 is formed with the rack 243 thereon in mesh with the pinion 244. It will be seen that the rotation of the pinion 244 effected by the driving of the motor 249 causes the piston 241 to slidably move in the cylinder 240. The cylinder 240 is formed on its internal surface with longitudinally extending grooves 253 each for receiving a longitudinally extending projection 254 formed on the surface of the piston 241 to prevent the latter from rotating in the cylinder 240. Cylinders 240a-240e and pistons 241a-241e have an identical construction as described.

Figure 8A:
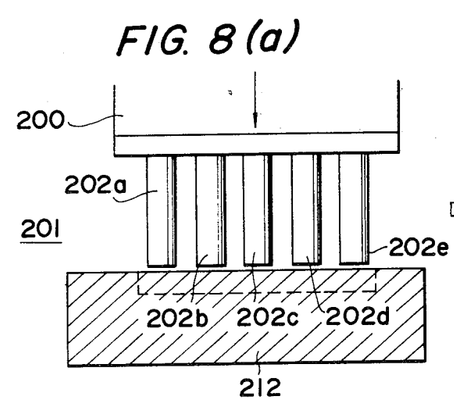
FIGS. 8(a), 8(b) and 8(c) are elevational views, showing a series of operating steps, of the pipe elementary electrodes of FIG. 6 in machining a workpiece.
Figure 8B:
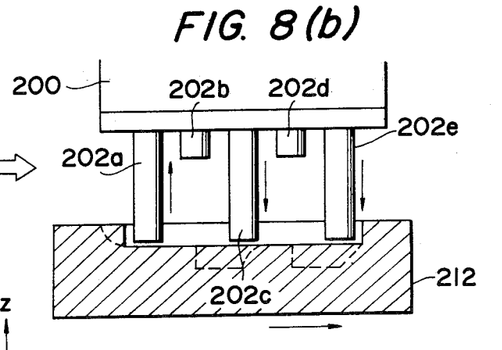
Figure 8C:
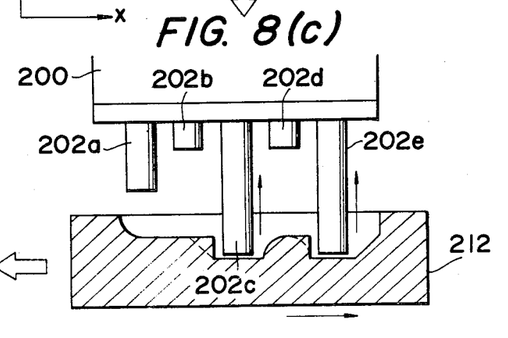
Figure 8D:
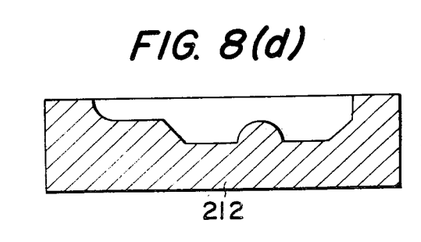

An example of the sequence of EDM operations which can be performed with the embodiment of FIG. 6 will be apparent by referring to FIGS. 8(a) to 8(d). The initial step, as shown in FIG. 8(a), includes permitting the multiple pipe electrodes 202a-202e to be extended by an equal length from the head 200 and holding them securely. The head 200 is then moved down to advance the electrode assembly 201 into the workpiece 212 to form a machined cavity therein as indicated by the broken line. During this downward movement along the Z-axis, the workpiece 212 is moved in the X-Y plane by a distance slightly in excess of inter-pipe distance G along each of the X- and Y-axes to achieve the smoothly machined surface. In the second step shown in FIG. 8(b), the pipe elements 202b and 202d are retracted, permitting machining to be performed with the pipe elements 202a, 202c and 202e. Then, with the head 200 held to be stationary, the pipe element 202a is gradually moved upwards and simultaneously the pipe elements 202c and 202e are gradually moved downwards, while the workpiece 212 is moved in the direction of X-axis or to the right. The data for the rates of movement of the elements 202a, 202c and 202e and for the rate of movement of the workpiece are preprogrammed in the NC unit 225. Depending upon relative rates of movement, it will be seen that three further shapes indicated by broken lines in FIG. 6(b) are machined and added to the previously machined contour. In the step shown in FIG. 8(c), the workpiece 212 is permitted to continuingly move in the direction of X-axis while the pipe elements 202c and 202e are moved upwards at different rates of movement to produce further contours indicated therein. As the consequence of these steps, it is seen that an EDM cavity of a relatively intricate contour as shown n FIG. 8(d) is readily obtained.

Figure 9:
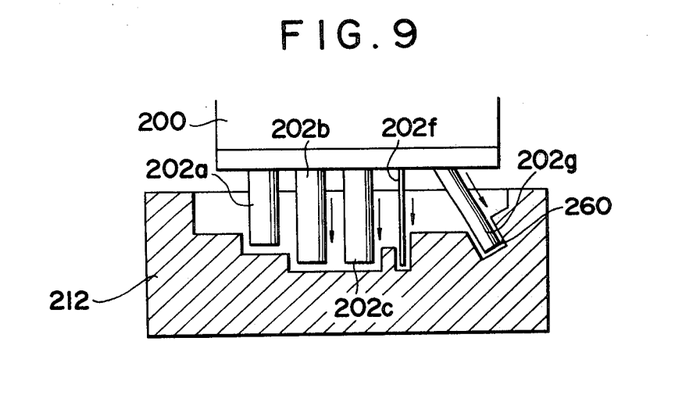
FIG. 9 is an elevational view illustrating a modified form of EDM operation using the apparatus of FIG. 6.

FIG. 9 shows a further electrode assembly 201 including, in addition to parallel or vertical pipe electrodes 202a-202f, a further pipe electrode element 202g obliquely mounted to the electrode head 200 to be advanced obliquely to machine a peculiar recess 260 which the final overall cavity may desirably include.

Figure 10:
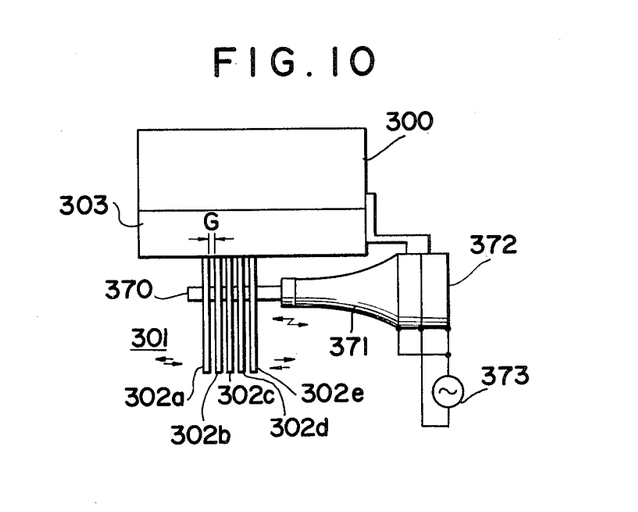
FIG. 10 is an elevational view diagrammatically illustrating a vibration means which may be used to transversely displace the pipe electrodes by a small distance in carrying out the method of the invention.

In FIG. 10 there is shown a multiple pipe element electrode assembly 301 comprising a multiplicity of pipe elements 302a, 302b, 302c, 302d, 302e, . . . as hereinbefore described. These pipe elements should, as hereinbefore described, be of a thickness (outer diameter) not greater than 1 mm, preferably at most 0.5 mm and are preferably composed of copper or brass. These pipe elements are arranged in parallel with one another and, in mutually insulating relationship, secured to a support plate 303. In the arrangement shown, the pipe elements 302a . . . 302e . . . have a bar 370 secured thereto, the bar being attached to the tip of a horn body 371 of an ultrasonic vibration system of conventional design. The body 371 is carried by the tool head 300. In the system, an electrochemical transducer 372 is secured to the horn 371 and is energized by a high-frequency power supply 373 to produce an ultrasonic vibration therein which is amplified by and transmitted through the horn 371 to vibrate the pipe elements 302a . . . 302e . . . in unison with a small amplitude transversely to the axes thereof. The amplitude of the vibration is adjusted to be slightly in excess of the uniform spacing G between the adjacent pipe elements. A further ultrasonic assembly of the same form, though not shown, is provided to vibrate the pipe elements in the direction orthogonalo to the direction of vibration effected by the assembly 371-373.

What is claimed is:

1. An EDM method of machining a contoured cavity in a conductive workpiece, comprising:
   (a) forming a multiple pipe assembled EDM electrode by (a1) arranging a multiplicity of conductive open-ended pipe elements two-dimensionally in parallel with one another and spaced apart from one another with a predetermined uniform minimum spacing to establish a mutually electrically insulating relationship in such a manner that an imaginary envelope surface which is substantially defined collectively by the frontal open-end portions of said conductive pipe elements has a preselected three-dimensional contour complementary with a contour of a said cavity to be machined in the workpiece and (a2) securely holding together said multiplicity of pipe elements so arranged in sub-step (a1);
   (b) juxtaposing said multiple pipe assembled EDM electrode with the workpiece to define an EDM gap between the annular machining surface provided on each of said frontal open-end portions and said workpiece;
   (c) flushing said multiple EDM gap with a dielectric liquid by establishing a forced flow of said dielectric liquid through said pipe elements;
   (d) effecting a succession of electrical discharges through said flushed dielectric liquid across each of said multiple EDM gaps between said annular machining surfaces and the localized areas of the workpiece respective juxtaposed therewith by passing a succession of electrical pulses individually between each of said multiple pipe elements and said workpiece to cause EDM material removal from said localized areas; and
   (e) advancing said assembled electrode unitarily and relatively into said workpiece in a machining feed direction parallel with said pipe elements to a predetermined depth while relatively displacing said EDM electrode and said workpiece in a plane essentially orthogonal to said machining feed direction by a distance in excess of said predetermined uniform spacing along each of two mutually orthogonal axes on said plane.

2. The method defined in claim 1 wherein each of said pipe elements has a thickness not greater than 1 mm.

3. The method defined in claim 2 wherein said thickness is at most 0.5 mm.

4. The method defined in claim 1 wherein said pipe elements are composed of a material selected from the group consisting of copper and brass.

5. The method defined in claim 1, further comprising the step of pumping said dielectric liquid from each one of at least a proportion of said pipe elements into said EDM gap at a pressure between 10 and 100 kg/cm$^2$.

6. The method defined in claim 5 wherein said pressure is not less than 20 kg/cm$^2$.

7. The method defined in claim 6 wherein said pressure is not less than 30 kg/cm$^2$.

8. The method defined in claim 7 wherein said pressure is not less than 50 kg/cm$^2$.

9. The method defined in claim 5, further comprising the step of pumping said dielectric liquid from said EDM gaps into each of the pipe elements other than those of said proportion to establish a continuous forced flow of said dielectric liquid traversing each of said EDM gaps.

10. The method defined in claim 9, further comprising the step of intermittently reversing the direction of said continuous forced flow of the dielectric liquid through each of said multiple EDM gaps.

11. The method defined in claim 1 wherein said multiple pipe assembled electrode and said workpiece are relatively displaced in said plane by said distance slightly greater than said predetermined uniform spacing along each of said axes.

12. The method defined in claim 11 wherein said distance is not greater than 1 mm.

13. The method defined in claim 1, further comprising the steps of: producing said succession of electrical pulses by rectifying a commercial alternating current without transforming it to a continuous direct current, pulsing said continuous direct current to produce a succession of high-frequency pulses of a frequency between 100 kHz and 1 MHz, transforming said high-frequency pulses with a high-frequency transformer having a single primary winding responsive to said high-frequency pulses and a multiplicity of secondary windings each individually connected to said workpiece and one of said multiple pipe elements via a rectifier to produce a transformed high-frequency alternating current at each of said secondary windings and rectifying each said high-frequency alternating current with the associated one of said rectifiers to produce a succession of electrical pulses; and applying each said succession of electrical pulses individually between the associated one of said pipe elements and said workpiece.

14. The method defined in claim 1, wherein said multiple pipe assembled electrode and said workpiece are relatively displaced in said plane by said distance by imparting a high-frequency vibration to said pipe elements to transversely vibrate them with an amplitude essentially equal to said distance.

15. The method defined in claim 1, further comprising the steps of releasing at least a proportion of said pipe elements from said securely held state and permitting the released pipe elements to be moved individually to further machine said workpiece.

16. The method defined in claim 1 wherein said dielectric liquid is a deionized water liquid having a specific resistivity between $10^3$ and $10^5$ ohm-cm.

17. An EDM apparatus for machining a cavity in a workpiece, comprising:
a multiple pipe assembled EDM electrode comprising a multiplicity of conductive open-ended pipe elements arranged two-dimensionally in parallel with one another and spaced apart from one another with a predetermined uniform minimum small spacing to establish a mutually electrically insulating relationship and further such that an imaginary envelope surface essentially defined collectively by the frontal open-end portions of said conductive pipe elements has a preselected three-dimensional contour complementary with a contour of a said cavity to be formed in the workpiece;
means for securely holding together said conductive pipe elements so arranged and supporting said multiple pipe assembled EDM electrode to define an EDM gap between the annular machining surface provided on each of said frontal open-end portions and said workpiece;
liquid supply means for establishing a forced flow of a dielectric liquid through each of said pipe elements, thereby flushing said multiple EDM gaps with said dielectric liquid;
EDM power supply means for passing a succession of EDM pulses individually between each of said conductive pipe elements and said workpiece to effect a succession of electrical discharges through said flushed dielectric liquid across each of said multiple EDM gaps between said annular machining surfaces and the localized areas of the workpiece respectively juxtaposed therewith, thereby causing EDM material removal from said localized areas;
first drive means for advancing said electrode unitarily and relatively into said workpiece in a machining feed direction parallel with said pipe elements to a predetermined depth; and
second drive means for relatively displacing said EDM electrode and said workpiece in a plane essentially orthogonal to said machining feed direction by a distance in excess of said predetermined uniform spacing along each of two mutually orthogonal axes on said plane.

18. The apparatus defined in claim 17 wherein each of said pipe elements has a thickness not greater than 1 mm.

19. The apparatus defined in claim 17 or 18 wherein said liquid supply means includes means for pumping said dielectric in the region of each of said multiple EDM gaps at a pressure between 10 and 100 kg/cm$^2$.

20. The apparatus defined in claim 19 wherein said liquid supply means includes valve means operable for intermittently reversing the direction of the flow of said dielectric in the region of each of said multiple EDM gaps.

21. The apparatus defined in claim 1 wherein said second drive means includes vibration means for vibrating said pipe elements transversely to the axes thereof with an amplitude essentially equal to said distance.

22. The apparatus defined in claim 17 wherein at least one of said pipe elements is axially adjustable in position and wherein there is provided a position adjusting means which is effective on energization thereof to adjust the axial position of said or each said adjustable pipe element so as to suit a particular EDM operation to be or being carried out.

23. The apparatus defined in claim 22 wherein said position adjusting means comprises a plurality of individual position adjusting means associated with respective ones of said adjustable pipe elements, each such position adjusting means being effective on energization thereof to effect appropriate adjustment of the axial position of the associated adjustable pipe element.

24. The apparatus defined in claim 23, including a controller means for supplying in accordance with a pre-planned set of program control signals for controlling the enegization of the respective individual position adjusting means whereby to effect a desired sequence of EDM operations on the workpiece.

25. The apparatus defined in claim 23 or claim 24 wherein each of said individual position adjusting means comprises a stepping motor having an output member whose position changes by a discrete amount in response to each input signal supplied to the stepping motor.

26. The apparatus defined in claim 17 wherein a positive pressure machining liquid supply means is connected to at least some of said pipe elements whereby to supply the machining liquid to the region of said annular dielectric gaps through said at least some pipe elements, and a suction pressure generating machining liquid extraction means is connected to at least some others of said pipe elements so as to withdraw some of said machining liquid from the region of said dielectric gaps through said at least some others of the pipe elements.

27. An apparatus as defined in claim 17 wherein said EDM power supply includes high-frequency transformers having multiple secondary winding circuits, and multiple diodes connected in series with the respective secondary winding circuit for supplying each of at least a group of said pipe elements with said succession of EDM pulses.

28. The apparatus defined in claim 17 wherein said electrode assembly includes other open-ended pipe elements disposed and secured therein in a non-parallel manner relative to the aforesaid pipe elements that are disposed and secured in the parallel manner, said other pipe elements being connected to said power supply means for receiving the EDM pulses.

29. The apparatus defined in claim 28 wherein said other open-ended pipe elements are axially adjustable in position, and there is provided for adjusting the positions of said other adjustable pipe elements a position adjusting means which is effective on energization thereof to adjust the axial position of at least one of the adjustable pipe elements so as to suit a particular EDM operation to be or being carried out.

30. The apparatus defined in claim 17 wherein said pipe elements are composed of copper or an alloy thereof.

* * * * *